United States Patent

[11] 3,571,990

[72] Inventor Wendell E. Rossman
         3137 N. 53th St., Phoenix, Ariz. 85018
[21] Appl. No. 768,802
[22] Filed Oct. 18, 1968
[45] Patented Mar. 23, 1971

[54] AIR TERMINAL AND RELATED APPARATUS
    12 Claims, 9 Drawing Figs.
[52] U.S. Cl. .................................................. 52/30,
        52/33, 52/143, 52/175, 104/48, 187/12, 214/16.1
[51] Int. Cl. .................................................. E04h 6/06,
                                            B66b 9/06, B60s 13/00
[50] Field of Search ........................................ 52/174-
                    —176, 30, 126, 33, 143; 187/12; 104/48;
                                                 214/16.14 (C)

[56]                References Cited
               UNITED STATES PATENTS
1,298,499   3/1919   Hansen .................... 187/12X
1,358,062  11/1920   Davis ........................ 187/12
1,064,513   6/1913   McAllister et al. ...... 187/12
1,751,721   3/1930   Bellmann ................. 214/16.1
1,843,640   2/1932   Jackson et al. .......... 52/175X
2,405,294   8/1946   Delucchi ................... 52/33X
2,631,743   3/1953   Hornick .................... 52/176X
2,674,347   4/1954   Thompson ............... 187/12
2,908,946  10/1959   Sullivan ................... 52/175
3,136,267   6/1964   Kness ...................... 104/48
3,221,507  12/1965   Grossman ................ 104/48X

Primary Examiner—Frank L. Abbott
Assistant Examiner—Sam D. Burke, III
Attorneys—Kenyon and Kenyon and Reilly, Carr & Chapin ABSTRACT: Apparatus and structures for facilitating the loading and unloading of parked aircraft at an airport are disclosed. The structures include a radial shaped air terminal building having upper and lower above ground concourse levels, and an intermediate main passenger receiving and check-in level and a plurality of subterranean levels. Each of the concourse levels includes passenger concourses with appropriate passageway gates interconnecting the passenger concourses with the exterior of the building. The lower level of the two concourse levels has gangways projecting from its passageway gates at an elevated height corresponding to the height of passenger doors of ground level parked aircraft that may be parked adjacent the gangways to facilitate loading the aircraft from the lower concourse level and unloading it thereto. Apparatus is provided to park aircraft at an elevated height adjacent the upper concourse level of the two concourse levels and gangways extend from the passageway gates of the upper concourse level to the passenger doors of the adjacent elevated parked aircraft to facilitate loading from the upper concourse level and unloading of the aircraft thereto. The apparatus includes a lift sled which can lift a parked aircraft to an elevated position adjacent the terminal building' s upper concourse level in two stages, insuring that the aircraft will not interfere with ground level parked aircraft adjacent the terminal building. The air terminal building's subterranean levels may be used for parking areas and mass transportation depots and are connected to the concourse levels and the main passenger receiving and check-in level by appropriate elevating means.

Fig. 4.

INVENTOR.
WENDELL E. ROSSMAN
BY
ATTORNEYS

INVENTOR.
WENDELL E. ROSSMAN
BY Kenyon & Kenyon
ATTORNEYS

AIR TERMINAL AND RELATED APPARATUS

This invention relates to structures and apparatus for facilitating the transferring of passengers and cargo between parked aircraft at an airport and an air terminal building.

With the rapid growth of the air transportation industry, problems of loading and unloading aircraft at commercial air terminals without lengthy delays have been greatly aggravated. This problem has been specifically aggravated with the advent of jets being used commercially and the large number of people they are capable of carrying with their reduced in-flight travel time. This has greatly increased the daily arrivals and departures at airports and the number of passengers for each arrival and departure, causing many airports to increase in size and congestion and hence compounding delays passengers encounter in trying to board designated aircraft.

At the present time, airport congestion and boarding delays are not really a problem with small country airports which have no more than five gate positions. At these small airports, a small terminal building with adjacent parking areas for cars works quite well. Upon arrival, check-in and boarding can be accomplished in a few minutes because walking distances are very short. Similarly, since walking distances are so short, baggage can usually be hand carried to the check-in counter, if one is used, or to the aircraft itself with a matter of minutes.

As the terminal increases in size to where it has about fifteen gates, the terminal building and its supporting facilities are expanded to a point where the passengers' ability to walk, carry baggage and do all the things necessary for departure and arrival have reached their practical limits. Walking distances to check-in counters and/or to parked aircraft from parking areas or bus and cab depots may total more than one quarter mile. Since only light luggage can be hand carried over these distances, curb-side luggage handling systems are required to assist the passenger with his heavy luggage. The passenger upon arriving at the airport has to leave his luggage with the curb-side luggage service and if he brings a car to the airport, park his car and then check-in and board the airplane. Since the distance between the parking areas and check-in areas are substantial, as are the distances from the check-in areas to the parked aircraft, passengers are wise at an airport of this size to allow at least 30 minutes between arrival and departure. A similar problem faces passengers arriving at the airport from incoming flights wishing to leave the airport. A further disadvantage of large airports is the great distances required for carrier transport within the airport buildings themselves and the large amounts of land required for the airport terminal.

As the size of the airport increases to 30 gates and more, the problems of the medium-sized airport are magnified almost geometrically. Walking distances inside the terminal alone can easily exceed 3,000 feet and, if the airport is a cluster of satellite terminals, it is possible to have to walk up to a mile from one terminal to another. Similarly, with large airport terminals it is usually very difficult to quickly locate appropriate terminal facilities such as the proper check-in counter, gates, etc. With large airports it is often wise to arrive about 40 minutes before departure time to allow for time to have the baggage checked, reach the check-in counter and reach the departure gate. This problem is of course aggravated if the arriving passenger has to park his car, since parking lots at airports of this size may be a very large distance from the air terminal building.

Internal automation such as mechanization of baggage handling, moving sidewalks, interairline transportation, landside and/or curb-side tramways all strive to minimize passenger ground travel and waiting time at airport terminals but as the size of the airport increases, these attempts fail to appreciably reduce waiting and ground travel time.

The major cause of boarding delays at airports are the great distances between the airport passenger terminals and parking areas and the parked aircraft which the passengers are to board. Attempts to minimize this distance by parking the aircraft in clusters, geometrical configurations simulating the shape of a T or a Y, etc., as close to the terminal building as possible have not been able to significantly minimize the distance between the air terminal building and the parked aircraft, nor have present day airports minimized the distance from the airport parking areas to the air terminal building. Similarly, even the most efficiently designed airports soon become inefficient in operation as the air traffic at the airport increases along with an increase in the size of the aircraft and the present arrangement of parking the aircraft and the lack of adequate room to taxi the aircraft in and away from the terminal. Thus, it is extremely desirable to design an airport than can efficiently handle present air traffic and yet have sufficient flexibility to be able to increase the amount of air traffic the airport can efficiently handle as might be required in the future.

A further problem is that with the advent of jets and increased air traffic it is necessary for the airports to move from heavily populated urban centers to nearby less populated suburban centers. Areas required for passenger car parking become vast, increasing the distance the passenger must traverse from the parking areas to check-in areas and the parked aircraft.

It is therefore an object of the present invention to provide an improved system, structures and apparatus to expedite the loading and unloading of passengers and cargo on and off parked aircraft at an airport.

A further object of the present invention is to provide an airport that will minimize the distance between the passenger arrival area at an airport and the parked aircraft thereabout.

More specifically, it is an object of the present invention to minimize the distance between airport parking areas and both airport check-in counters and parked aircraft so passengers can traverse this distance in a minimum amount of time.

Another object of the present invention is to provide an airport that has facilities to receive passengers by bus, train, car, helicopter, etc. and that will minimize the distance each passenger must traverse when arriving at the airport to reach the appropriate check-in area and the parked aircraft he will depart on. Still another object of the present invention is to provide an air terminal design that will require a minimum amount of land for facilitating the arrival and departure of aircraft while minimizing the internal distances that must be traversed within the air terminal building.

A further object of the present invention is to provide a novel air terminal building that will aid in achieving each of the preceeding objects.

Yet another object of the present invention is to provide a novel air terminal building for use at an airport that will facilitate the loading and unloading of passengers and cargo between parked aircraft and the terminal building, the terminal building being designed so as to be able to be modified to handle increased air traffic at the airport when the need arises.

Another object of the present invention is to provide apparatus that can simply and economically move parked aircraft to elevated positions adjacent a terminal building to facilitate loading and unloading of the aircraft.

Another object of the present invention is to provide apparatus that will allow a maximum number of aircraft to be parked in a minimum amount of space.

Briefly, in accordance with the present invention, the foregoing and other objects are accomplished by an air terminal building having upper and lower concourse levels above ground level, an intermediate main passenger receiving and check-in level and several subterranean levels. Apparatus is provided interior and exterior the terminal building for parking aircraft adjacent the upper concourse level so that gangways which project from this level may be used to facilitate the transfer of passengers and cargo between the adjacent elevated parked aircraft and the upper concourse level. Similarly, gangways project from the lower concourse level to facilitate loading and unloading between ground level parked aircraft that are parked adjacent the terminal building and the lower concourse level of the terminal building. The subterranean terminal levels, which are connected to the other levels, may be used to park cars and as depots for mass transportation systems that may bring passengers to the terminal and are joined to the other levels by elevating means.

Other objects, aspects and features of the present invention will be apparent from the following specification and drawings in which;

FIG. 9 illustrates the structure for moving the lifting apparatus of the present invention.

Figure 1:
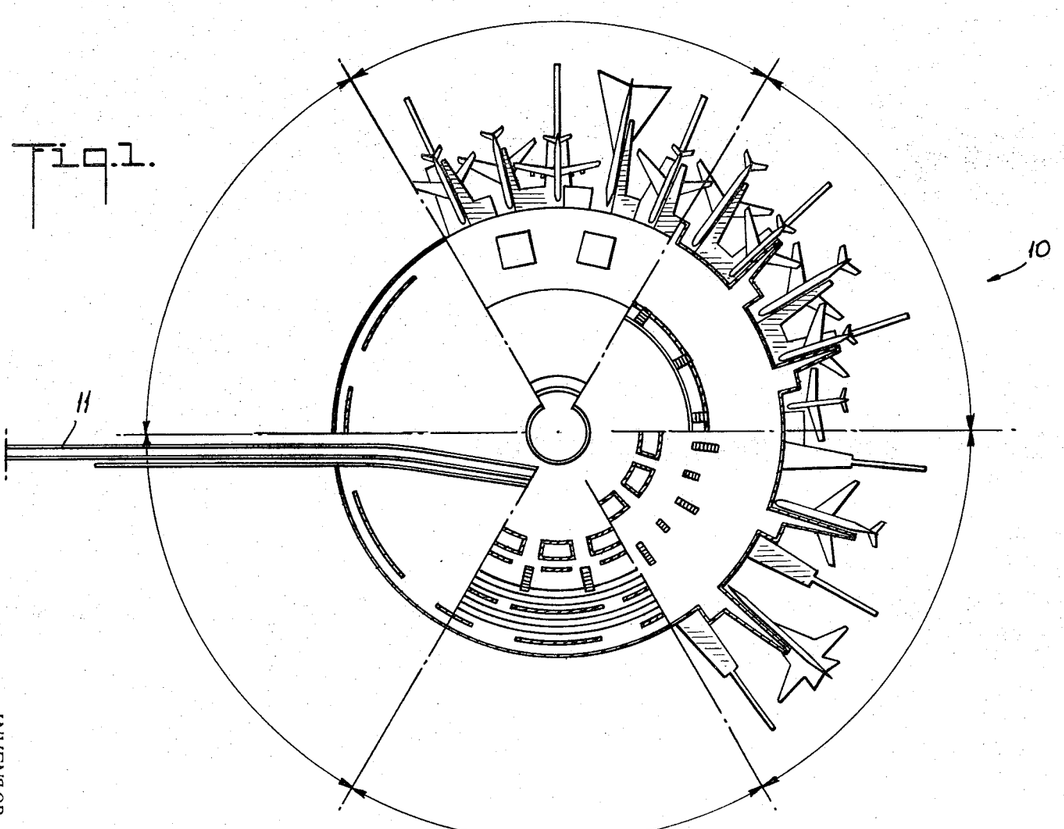
FIG. 1 is a plan view of an air terminal building in accordance with the present invention.
Figure 2:
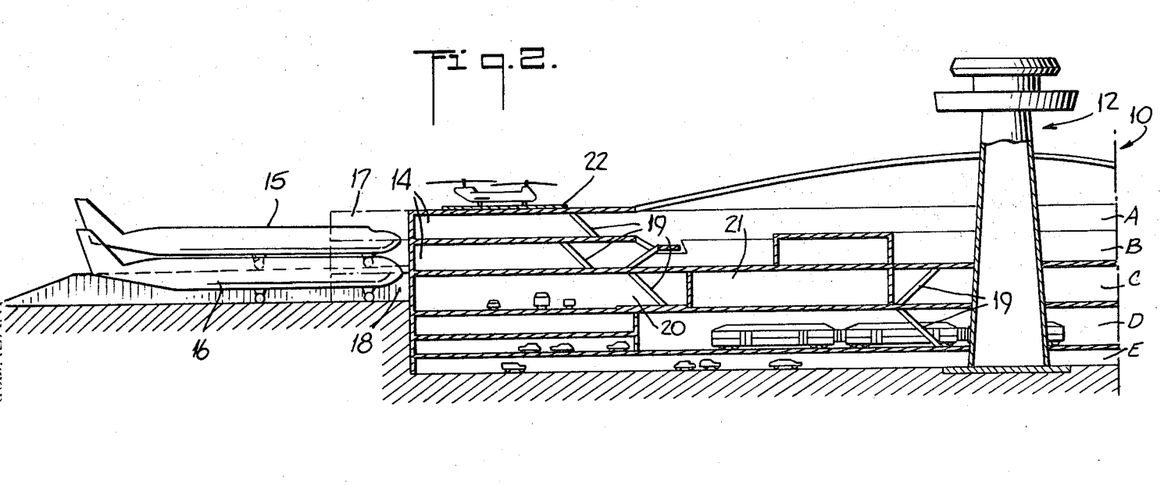
FIG. 2 is a partial cross-sectional view of the air terminal building shown in FIG. 1.

In FIG. 1 an air terminal building 10, in accordance with the present invention, is seen to be radial and include facilities, later to be more fully described, on its perimeter for loading and unloading aircraft at a ground and above ground levels adjacent the terminal building. Tracks 11 lead to the interior of air terminal building 10, for a reason soon to be apparent. As can be seen in FIG. 2, air terminal building 10 includes a centrally located tower 12 and has a plurality of levels, A, B, C, D and E in descending order with the levels A and B above ground level in their entirety. While I have shown this configuration of levels, it is of course to be understood that different levels and configurations could be used without departing from the scope of the invention. The parts of levels A and B adjacent the periphery of terminal building 10 are used as concourses 14 and have gates for loading and unloading passengers on and off the aircraft parked adjacent terminal building 10.

Figure 3:
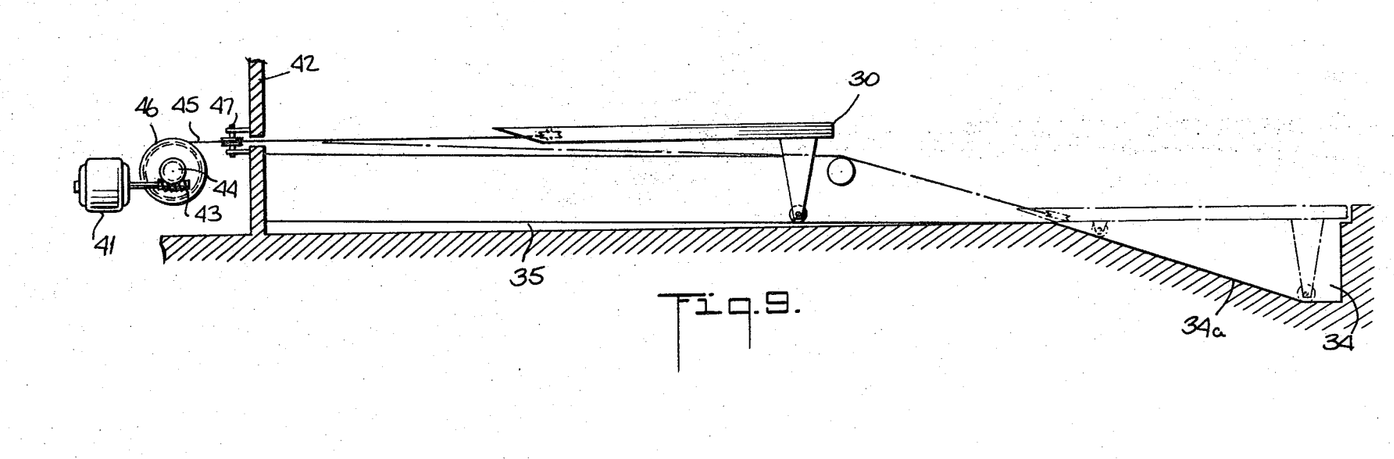
FIG. 3 is a plan view illustrating how aircraft may be positioned in parked row adjacent the air terminal building of the present invention.

As can be seen in FIGS. 2 and 3, there are two levels on which aircraft can be parked adjacent terminal building 10 with the aircraft identified by the number 15 positioned above ground level adjacent terminal building 10 and the aircraft identified by the number 16 positioned at ground level adjacent terminal building 10. The aircraft parked at elevated heights adjacent terminal building 10 are a sufficient distance above ground level so that boarding gangways or bridges 17 which extend from gates on level A are at the approximate elevation above ground as the doors on the parked elevated aircraft to facilitate loading and unloading of the aircraft without the need for a portable elevating means. Gangways or bridges 18 which extend from gates on level B are approximately level with the doors of a ground level parked aircraft so that portable elevating means are not required to transfer passengers between level B and the aircraft. Of course, it will be necessary for gangways or bridges 17 and 18 to be slightly adjustable in height to accommodate different height aircraft. Presently, there are a plurality of products on the market that could be used to provide the adjustable gangways and it is contemplated that any of these products could be used in constructing an embodiment of the present invention. Escalators 19 are between each of the levels to provide easy transportation therebetween, while circular conveyors may be located on the periphery of each level to provide easy transportation within a level. As can be seen from FIG. 2, only the peripheral portions of levels A and B are required as concourses to transfer passengers between the parked aircraft and these levels and the interior area of these levels may be used as required.

Level C is the main arrival and check-in level and roadways (not seen in the FIGS.) are connected to this level so cars and buses may deposit and pick up passengers at a passenger receiving area 20. A main check-in area 21 is located adjacent passenger receiving area 20 on level C so that passengers that are deposited by buses or cars at the passenger receiving area can be checked-in immediately adjacent the area where they arrive, without having to walk great distances to the check-in area. If the cars or buses are to be parked by the terminal they will be driven by ramps which connect level C with the parking areas on subterranean levels D and E. After check-in the passengers may ride an escalator to the level which corresponds to the location of the plane they are to board. Of course, if a passenger is driving a car himself, or wishes to stay with the people who are accompanying him to the airport, he may drive to level C and leave his baggage with a check-in service at receiving area 20 and then park his car and take an escalator to check-in area 21. Similarly a person who is driving to the air terminal to pick up passengers may wait for the passengers at receiving area 20, or go immediately to the subterranean parking areas and take an escalator to the receiving area to await arriving passengers.

As can be seen in FIG. 2, level D is divided on its periphery to form two levels, D-1 and D-2 which are used as parking areas. Mass transportation systems, such as trains and/or subways may arrive at the interior of level D by tracks 11 and the people disembarking therefrom may take an escalator to the check-in area 21. While one parking level E is shown below level D, it is of course apparent that more could be utilized as required. Helicopter landing areas 22 are located on the periphery of the roof of air terminal building 10 to accommodate passengers who arrive or depart the terminal building by helicopter. Escalators are adjacent each of the helicopter landing areas 22 and connect the helicopter arrival areas and the main arrival area to facilitate easy transfer between these locations.

Figure 4:
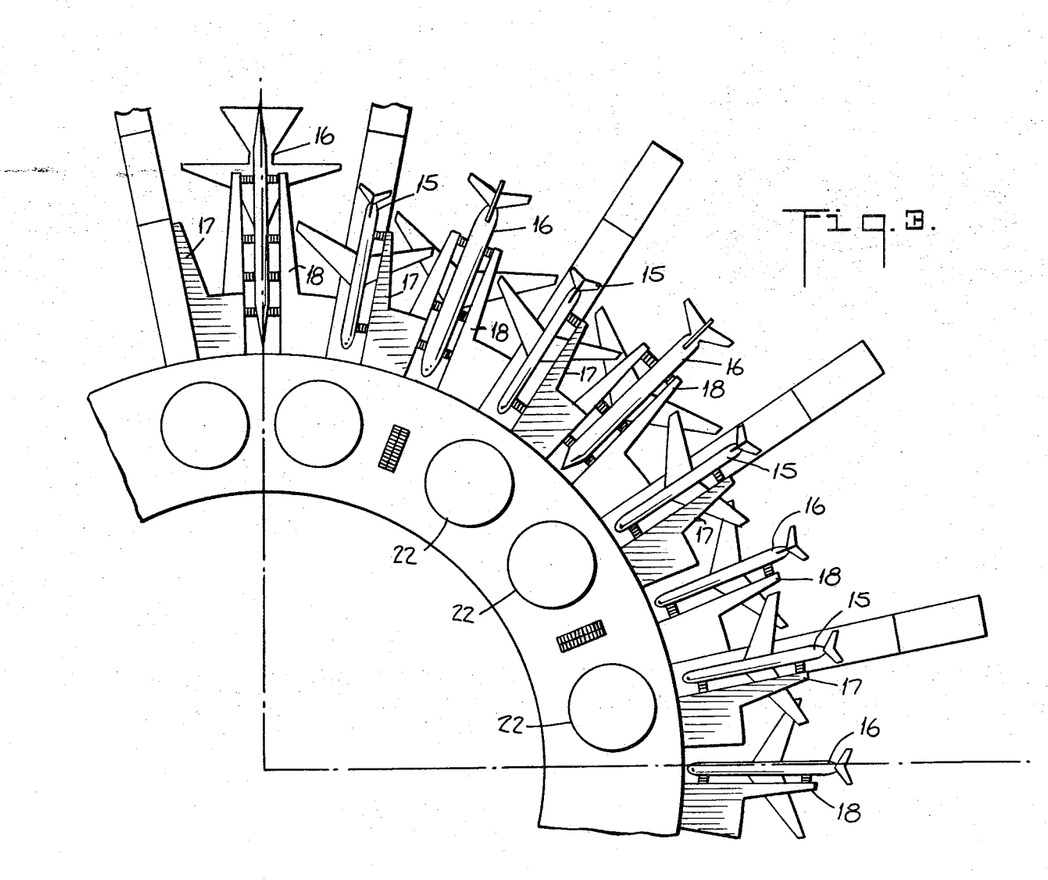
FIG. 4 illustrates in perspective an aircraft being moved to an elevated parking position according to the present invention.
Figure 5:
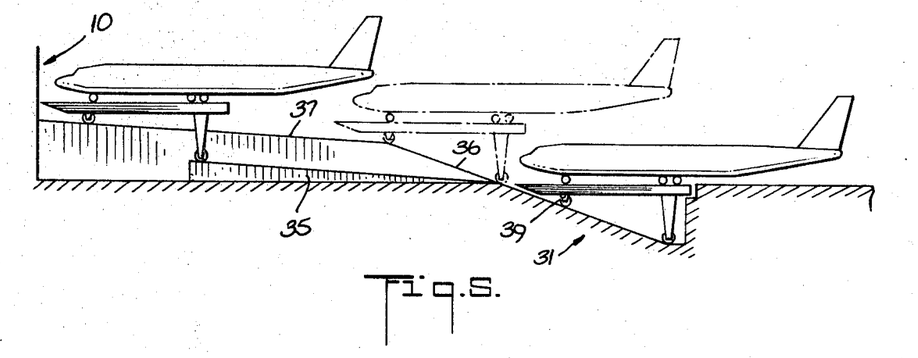
FIGS. 5 and 6 show side and top views, respectively, of the different stages of parking an aircraft at an elevated position.

In FIGS. 4—9 one of the identical lift sleds 30 that is used to move parked aircraft between an elevated position adjacent gangways 17 of terminal building 10 and a ground location 31, a short distance from the terminal building, is seen. Since all of the lift sleds that are used to move aircraft to the different elevated areas adjacent each gangway or bridge 17 of level A are identical to each other, a thorough description of one such apparatus is sufficient for an understanding of the invention. The lift sled rides on at least one center rail 32 (two rails are shown in the drawings for illustrative purposes only) and flanking rails 33 which extend from ground location 31 to an elevation adjacent level A of air terminal building 10 FIGS. 4 and 6). The sleds may be various sizes and should contain markings to indicate the size of aircraft that may be transferred by the individual sled. At the ground location is a pit 34 which includes inclined surface 34a, the latter extending to the edge of the pit closest to air terminal building and upon which rails 32 and 33 are mounted FIGS. 6). Adjacent the part of pit 34 closest to terminal 10 is an inclined ramp 35 which extends to a short distance from terminal 10 or can extend to terminal 10 if desired. As the slope of ramp 35 is very slight, the height of the ramp is much lower than the elevation of level A where the ramp is adjacent the terminal building. Located near the respective sides of ramp 35 for the length of the ramp and extending from pit 34 are rails 33. A second ramp 36 (FIGS. 4 and 5) projects upwardly from the middle of ramp 35 near the portion of ramp 35 adjacent pit 34 for a percentage of the length of ramp 35, this percentage being determined in parts by the size of the aircraft that park on the main runway level. As can be seen in FIG. 5, ramp 36 is inclined at a greater angle from ground level than is ramp 35. A third ramp 37 projects upwardly from the middle of ramp 35 and is continuous to ramp 36 and extends from ramp 35 to terminal building 10 at a slight incline. Center rail 32, or rails as the case may be, extend from the middle of inclined surface 34a along ramps 36 and 37 until they are adjacent terminal building 10 (FIG. 4). Sled 30 is utilized for transporting aircraft from the ground location via rails 32 and 33 to an elevated position adjacent gangway or bridge 17 of terminal building 10. Sled 30 has approximately the same cross section area as pit 34 and includes a front central strut 39 and flanking rear struts 40. A wheel or wheels are attached to strut 39 to ride on rail(s) 32 and wheels are attached to rear struts 40 to ride on rails 33, the latter struts of greater height than strut 39. The ground between pit 34 and the terminal building slopes downwardly towards the pit which connects to a disposal system so the pit will catch spilled fuel and rainwater. The catching of spilled fuel by the pit is an obvious safety feature since if the spilled fuel ignites and spreads, it will be easy to extinguish in the pit by a fire fighting system which may be located in the pit.

The apparatus for moving sled 30 from pit 34 to where it is adjacent terminal level B is best seen in FIG. 9. A motor 41 is located adjacent wall 42 of terminal building 10 within the building and drives a worm 43 which is coupled to a worm gear 44. A cable, or chain 45 (hereinafter referred to as a cable for illustrative purposes only) is wound about a reversible self-braking winch drum 46 which rotates with worm gear 44 and rides a pulley 47 to project through an opening in wall 42 to be fastened to the front of sled 30.

Figure 6:
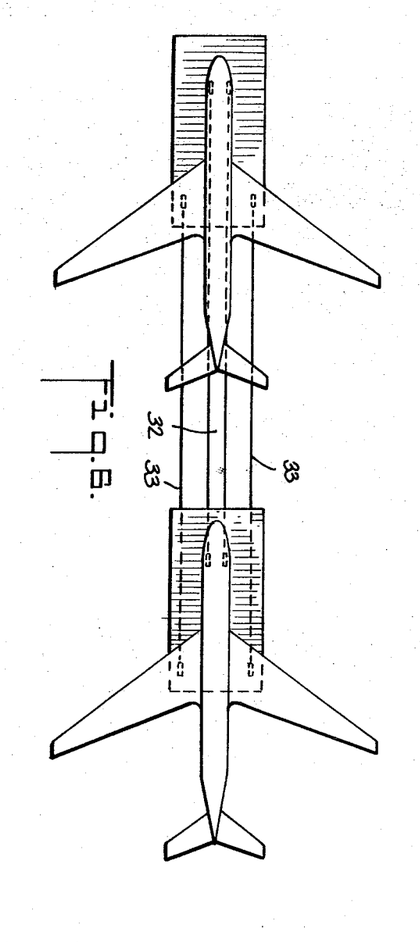
Figure 7:
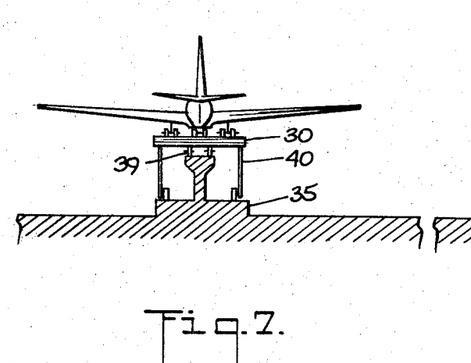
FIG. 7 shows a front view of an aircraft in a parked position.
Figure 8:
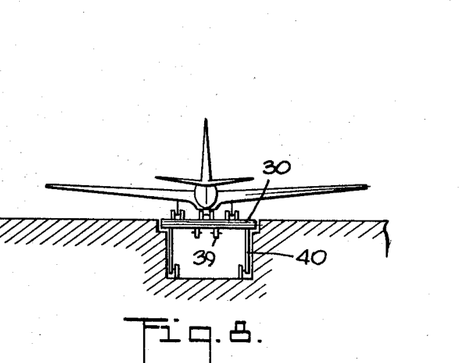
FIG. 8 shows a front view of an aircraft parked on the lifting apparatus of the present invention at ground level.

The operation of the sled mechanism is quite simple. Normally sled 30 will cover pit 34 at ground level so a plane may taxi on to the sled as seen in FIGS. 5, 6 and 8 with the front wheels of the airplane above strut 39 and the rear wheels of the aircraft above struts 40. As can be seen in FIGS. 5 and 6, the tail of the aircraft will project past the rear part of sled 30 as the sled is only slightly longer than the distance between the front and rear wheels of the aircraft. With the aircraft on sled 30, motor 41 will be actuated with the sled and aircraft leaving pit 34 with the sled's front wheels (s) riding on rail(s) 32 and the rear wheels of the sled riding on rails 33, as seen in FIGS. 4 and 5. As a safety feature to prevent vehicles or people from falling into pit 34 a cover plate can cover the pit when the sled is removed therefrom or a normally underground guard rail can be automatically lifted to surround the uncovered open pit. During the initial portion of the sled's travel towards terminal building 10 the front wheel(s) of the sled will be on platform 36 with the rear wheels on platform 35. This can be seen in FIGS. 4 and in dotted lines in FIG. 5. Continued rotation by motor 41 will bring sled 30 and the aircraft parked thereon to the position seen in solid lines on the left in FIG. 5 with the front wheel(s) of the sled on platform 37 and the rear wheels on the part of platform 35 closest to air terminal building 10. The aircraft will now be in an elevated position as seen in FIGS. 2, 5 and 7 immediately adjacent elevated gangway 17 so passengers may move between the elevated parked aircraft and upper level A by means of the ramp.

A significant aspect of the lifting apparatus of the present invention is that the aircraft after leaving pit area 34 moves towards the elevated position adjacent terminal building 10 in two stages via ramps 36 and 37. The reason for using two stages is that if one gradual stage were used, it is possible that the aircraft that is being horizontally and vertically moved towards a position adjacent gangway or bridge 17 of air terminal 10 might collide with a ground level parked aircraft that is adjacent terminal 10. By rapidly during the first stage, and at a sufficient distance from the terminal building, elevating an aircraft to substantially the elevation of level B and above the elevation of the wings, tail and fuselage of a ground level parked aircraft that may be adjacent the terminal building, the danger of an aircraft that is being moved to an elevated position colliding with a parked ground level aircraft adjacent the terminal building is eliminated. Additionally, it is noted that by having the front wheel(s) of sled 30 elevated relative to the rear wheels of the sled, the sled and aircraft parked thereon will always be horizontal as the sled is moved toward terminal 10. Similarly, due to the staggered position of rails 32 and 33, the rate of climb of the sled may easily be varied as desired and used for gravity return when the sled is moving away from the terminal building.

Normally the aircraft that are to be parked adjacent terminal 10 on ground level will taxi from the runway to the appropriate ground level parking adjacent terminal 10 and gangway or bridge 18 so the gangway will be adjacent to the passenger door of the aircraft to enable passengers to easily move between the aircraft and level B of the terminal building. Those aircraft that are to received passengers from elevated level A or allow passengers to depart thereto will under their own power taxi from the runway to a position on sled 30, as seen in FIG. 8, with the fuselage of the aircraft in alignment with the direction of travel of the sled as seen in FIG. 6. The sled will then move the aircraft to a parked elevated position adjacent terminal 10 and gangway or bridge 17 thereof as seen in FIGS. 2 and 3. This will allow passengers to move rapidly between the parked elevated aircraft and level A of the terminal building.

After the aircraft have been loaded or unloaded, as the case may be, the ground level parked aircraft will move from being adjacent the terminal building to a runway or servicing area under their own power. When it is desired to move an elevated parked aircraft from its position adjacent terminal building 10 the winch 46 merely plays out cable 45 with the slight incline of the various ramps moving the aircraft and sled to pit area 34 by the force of gravity at which time the guard rails surrounding the pit will be depressed or the plate covering the pit removed therefrom. Once the sled and aircraft are at pit area 34 the aircraft may rotate under its own power and depart to a runway. An added feature of the invention is that transit and even terminal servicing can be done while an aircraft is in a parked elevated position. In FIG. 4 a large working platform is seen adjacent where the lift sled would park an aircraft when the aircraft is to be parked at an elevated level so as to provide an area from which a parked aircraft may be serviced.

A feature of the lift sled apparatus that deserves special attention is locating of the electric motor drive within the confines of air terminal building 10, thus avoiding the danger of exposing the electric motor to any engine fuel or vapor that may be near the parked aircraft.

By using the lift sled apparatus of the present invention so aircraft are parked adjacent the terminal building parallel to each other in two levels, the density of the parked aircraft significantly surpasses the density of aircraft parked convergent towards a common point in a single plane, as is now the practice at most airports, minimizing distances that must be traversed from the terminal building to the parked aircraft. Similarly, by having the parking areas within the confines of the terminal building the distance from the parking areas to the check-in and concourse areas is reduced.

Terminal building 10 up to the main vertical fire wall 42 may be of permanent construction. However, the lateral positioning of waiting rooms, gangways, bridges and even the lift sled should be sufficiently flexible and movable to accommodate a great variety of different size aircraft and varying numbers of aircraft. The center space of the terminal building may be covered by a shallow spherical shell roof, if desired.

The terminal building of the present invention can be constructed to handle air traffic at the time of construction and have its capacity expand to meet the requirements of projected increased air traffic as it occurs. One method of achieving this would be to build the terminal building in segments. Thus, a terminal building with an ultimate capacity of 64 gates can be built in increments. One phase might consist of 32 gates and thus the terminal building would extend for only 180°. Additional gates and lifting sled could be added to increase the terminal's capacity to 64 gates as needed.

A second method of expanding the capacity of the airport would be to construct a radial terminal building with gates dispersed at spaced intervals along the circumference of the upper and lower levels with multiple use of the segments of the terminal by passengers and freight. As passenger volume increases, freight gates are gradually absorbed until all the terminal gates are fully taken for passenger service.

It is believed the procedures for utilizing the structures and apparatus of the present invention are readily apparent from the foregoing description which describes an airport which can efficiently handle a high volume of air traffic, while minimizing the delays that passengers encounter from the time of their arrival at the airport until they are aboard their designated aircraft. Similarly, the structures and apparatus of the present invention are of low cost, require a minimum amount of land and include many safety features, increasing their desirability.

While I have specifically disclosed a radially shaped air terminal building it is of course apparent that my two level system of parking aircraft could be used with terminal buildings of different configurations.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

I claim:

1. An air terminal building for loading and unloading of aircraft comprising;
    a building structure having an outer wall, the structure having at least two vertically disposed aboveground levels enclosed in part within said wall,
    a plurality of gate means located in said wall communicating with the interior of each said level,
    boarding bridges projecting exteriorly from said wall from at least some of said gate means and being disposed in alternating communication with said levels to communicate the interior of each said level with aircraft parked exteriorly of said structure adjacent each said level to enable passengers to move between aircraft parked adjacent each said level exteriorly of said structure and said levels, and
    means for elevating an aircraft to the level of the uppermost of said aboveground levels adjacent the boarding bridge thereat.

2. An air terminal in accordance with claim 1 wherein said structure has at least said one subterranean level and a parking area located on said subterranean level.

3. An air terminal in accordance with a claim 2, wherein a mass transportation depot is located on said subterranean level and which further comprises means interconnecting each of said levels for facilitating transportation therebetween.

4. An air terminal in accordance with claim 2, wherein said structure includes a middle level located between said two aboveground levels and the uppermost subterranean level, said middle level including an area in which passengers arriving at the air terminal by vehicle may be deposited at and picked-up from, said structure including a roof, at least one helicopter landing pad located on said roof and means connecting said roof with said level immediately therebelow.

5. An air terminal in accordance with claim 1, wherein said structure is circular in shape and has a passenger concourse area located on the peripheral portion of each of said aboveground levels.

6. An air terminal building for loading and unloading of aircraft comprising a building structure having an outer wall, the structure having at least two vertically disposed aboveground levels enclosed in part by said wall, a plurality of passage means located in said wall for communicating the interior of each of said levels with aircraft that may be parked exterior of said structure adjacent each of said levels, and boarding bridges projecting exteriorly of said wall from at least some of said passage means of said levels and flanking the passage means that are in said wall for the next highest of said aboveground levels to enable passengers to move between aircraft that may be parked adjacent each level exteriorly of said structure and said levels themselves, and means for elevating aircraft to a position adjacent the upper of said two levels, said elevating means including a lift sled upon which an aircraft may be positioned and means for lifting said lift sled from a ground location a substantial distance from said air terminal to a position immediately adjacent the upper level of said two levels in two stages in which said first stage rapidly elevates said sled to a sufficient height so that aircraft that may be parked adjacent said air terminal building at ground level are not hit as the aircraft on the sled is moved from the ground location to the position adjacent the upper level and said second stage gradually elevates and moves said sled from said first stage to a position adjacent said boarding bridges of said upper of said two levels.

7. An air terminal in accordance with claim 6, wherein at least three parallel rails upon which said lift sled rides extend from said ground location to a position adjacent said upper of said two levels, at least one center rail rapidly rising for a first distance from said ground location towards said upper of said two levels so as to be able to rapidly elevate said sled in said first stage to avoid aircraft that may be parked on ground level immediately adjacent said air terminal building, said center rail thereafter rising at a more gradual rate for the distance to the position and elevation immediately adjacent said upper of said two levels, a pair of rails flanking said center rail and extending from said ground location in a straight path to a location adjacent said structure and intermediate the elevation of said lower of said two levels, the straight path of said pair of flanking rails being continually at a lower elevation than the elevation of said center rail.

8. An air terminal building in accordance with claim 7, further including a first ramp extending in a straight path from said ground location to a position adjacent to said lower of said two upper levels and intermediate the elevation thereof, a second ramp located on said first ramp and extending on said first ramp from said ground location and having a defined slope for said first distance, a third ramp located on said first ramp and continuous with said second ramp and having a defined slope smaller than said slope of said second ramp and extending from said second ramp to said position and elevation immediately adjacent said upper of said two levels, said center rail mounted on said second and third ramps and said flanking rails mounted on said second and third ramps and said flanking rails mounted on said first ramp, said third ramp sufficiently above ground level to avoid having any airplane parked on the lift sled from colliding with a ground level parked aircraft whereby the lift sled may return from an elevated position adjacent the building structure to said ground level by gravity due to the slope of the second and third ramps.

9. An air terminal in accordance with claim 8, wherein a pit of the approximate area of said sled is located at said ground location, an inclined side in said pit, said rails extending on to said inclined side, said sled including a front strut and rear struts which ride on said center rail and said flanking rails, respectively, said rear struts of greater height than said front struts and said ground from said structure sloping downwards toward said pit whereby said pit may be used as a catch basin for water and spilled fuel adjacent said structure.

10. Lifting apparatus for lifting an aircraft from a first location to a second distant location that is elevated relative to said first location in two stages with the first stage elevating the aircraft very rapidly so as to allow the aircraft to be elevated sufficiently to be lifted over aircraft that are a parked adjacent the second location at ground level comprising a sled upon which the aircraft may be placed, at least one center rail and two flanking rails extending from said first location to said second location, said center rail at a higher elevation than said flanking rails and said sled riding on said center and flanking rails, said center rail extending from said first location to said second location in two stages with the first stage extending from the first location with the slope of said rail greater in said first stage than said second stage and said flanking rails extending from said first location to said second location in a single straight path and means for moving said sled along said rails from said first location to said second location whereby the sled may be returned to said first location from said second location by the force of gravity when said means are not in moving or locking relation with said sled.

11. Lifting apparatus in accordance with claim 10, wherein a first ramp extends from said first location to a position at least adjacent said second location, a second ramp located on said first ramp and extending from said first location to a distance intermediate the length of said first ramp, a third ramp located on said first ramp extending from said second ramp to said second location, said first, second and third ramps each having a different slope and said center rail located on said second and third ramps and said flanking rails on said first ramp.

12. Apparatus according to claim 11, wherein said sled has a front central strut which rides on said center rail and rear struts that ride on said flanking rails, said rear struts of a greater height than said front strut.

UNITED STATES PATENT OFFICE
CERTIFICATE OF CORRECTION

Patent No. 3,571,990     Dated March 23, 1971

Inventor(s) Wendell E. Rossman

It is certified that error appears in the above-identified patent and that said Letters Patent are hereby corrected as shown below:

Column 1, line 25, "with" should be --within--

Column 4, line 49, insert "(" before "Fig."
Column 4, line 55, insert "(" before "Fig."
Column 6, line 7, "received" should be --receive--

Claim 8, lines 41 and 42 delete "said second...mounted on

Signed and sealed this 17th day of August 1971.

(SEAL)
Attest:

EDWARD M. FLETCHER, JR.
Attesting Officer

WILLIAM E. SCHUYLER, JR.
Commissioner of Patents